United States Patent
Allison, III

(10) Patent No.: US 8,847,531 B2
(45) Date of Patent: Sep. 30, 2014

(54) SAMPLE AND HOLD TIME STAMP FOR SENSING ZERO CROSSING OF BACK ELECTROMOTIVE FORCE IN 3-PHASE BRUSHLESS DC MOTORS

(71) Applicant: IXYS CH GmbH, Bruegg bei Biel (CH)

(72) Inventor: Rex L. Allison, III, Santa Clara, CA (US)

(73) Assignee: IXYS CH GmbH (CH)

(*) Notice: Subject to any disclaimer, the term of this patent is extended or adjusted under 35 U.S.C. 154(b) by 7 days.

(21) Appl. No.: 13/740,066

(22) Filed: Jan. 11, 2013

(65) Prior Publication Data

US 2013/0127385 A1 May 23, 2013

Related U.S. Application Data

(63) Continuation of application No. 13/134,141, filed on May 31, 2011, now Pat. No. 8,358,093, and a continuation of application No. 11/495,913, filed on Jul. 29, 2006, now Pat. No. 8,030,867.

(51) Int. Cl.
*H02P 6/18* (2006.01)
(52) U.S. Cl.
CPC ..................................... *H02P 6/182* (2013.01)
USPC ............ 318/400.35; 318/400.32; 318/400.01; 318/700; 318/400.34; 324/765.01
(58) Field of Classification Search
USPC ............ 318/599, 601, 604, 636, 139, 400.01, 318/400.03, 400.34, 400.35, 400.36, 778, 318/798, 811, 700, 400.32; 324/765.01
See application file for complete search history.

(56) References Cited

U.S. PATENT DOCUMENTS

| | | | |
|---|---|---|---|
| 5,003,241 A | 3/1991 | Rowan et al. | 318/761 |
| 5,017,845 A | 5/1991 | Carobolante et al. | 318/400.11 |
| 5,319,289 A | 6/1994 | Austin et al. | 318/400.14 |
| 5,455,498 A * | 10/1995 | Kakimoto et al. | 318/605 |
| 5,548,197 A | 8/1996 | Unsworth et al. | 318/757 |
| 5,789,895 A * | 8/1998 | Lee | 318/811 |
| 5,841,252 A | 11/1998 | Dunfield | 318/400.32 |
| 5,909,095 A * | 6/1999 | Sakti et al. | 318/400.35 |
| 5,929,577 A * | 7/1999 | Neidorff et al. | 318/400.35 |
| 6,504,328 B1 * | 1/2003 | Gontowski, Jr. | 318/400.25 |
| 6,703,805 B2 | 3/2004 | Griffitts | 318/459 |
| 6,873,142 B2 * | 3/2005 | Pierson | 323/299 |
| 7,034,478 B2 * | 4/2006 | Bhaumik et al. | 318/400.35 |
| 7,072,778 B2 * | 7/2006 | Swanson | 702/57 |
| 7,138,776 B1 * | 11/2006 | Gauthier et al. | 318/400.34 |
| 7,202,618 B2 * | 4/2007 | Ide et al. | 318/400.12 |

(Continued)

*Primary Examiner* — Rita Leykin
(74) *Attorney, Agent, or Firm* — Imperium Patent Works; Darien K. Wallace

(57) ABSTRACT

A microcontroller determines the position of the rotor of a brushless, direct-current motor by determining the time of zero crossing of back electromotive force (EMF) emanating from the non-driven phase winding. The zero crossing point is determined by interpolating voltage differentials that are time stamped. Each voltage differential is the difference between the phase voltage of the phase winding and the motor neutral point voltage. The time of zero crossing is determined without using a comparator and without interrupting the processor at each zero crossing point. The processor interpolates the time of zero crossing independently of when the zero crossing point occurs. A hold signal conductor is connected both to a sample and hold circuit and to the load input lead of a time stamp register. The microcontroller simultaneously captures a phase voltage in the sample and hold circuit and a timer count in the time stamp register.

15 Claims, 5 Drawing Sheets

(56) References Cited

U.S. PATENT DOCUMENTS

| | | | |
|---|---|---|---|
| 7,609,013 B2 * | 10/2009 | Sugie | 318/400.06 |
| 7,720,180 B2 * | 5/2010 | Oshikubo et al. | 375/330 |
| 8,030,867 B1 | 10/2011 | Allison, III | 318/400.35 |
| 8,054,024 B2 | 11/2011 | Hayashi et al. | 318/400.34 |
| 8,212,508 B2 | 7/2012 | Paintz et al. | 318/400.34 |
| 2002/0136127 A1 * | 9/2002 | Watt | 369/53.3 |
| 2003/0102834 A1 | 6/2003 | Hussein | 318/400.13 |
| 2005/0104545 A1 | 5/2005 | Kikuchi | 318/400.34 |
| 2007/0216325 A1 | 9/2007 | Fukamizu et al. | 318/400.34 |
| 2007/0229004 A1 | 10/2007 | Fukamizu et al. | 318/400.26 |
| 2008/0018279 A1 | 1/2008 | Fukamizu et al. | 318/432 |
| 2008/0252240 A1 | 10/2008 | Sugie | 318/400.06 |
| 2009/0096397 A1 | 4/2009 | Paintz et al. | 318/400.35 |
| 2009/0146598 A1 | 6/2009 | Hayashi et al. | 318/400.34 |
| 2009/0153086 A1 | 6/2009 | Narumi et al. | 318/400.35 |
| 2009/0189556 A1 | 7/2009 | Itagaki et al. | 318/400.11 |
| 2010/0188037 A1 | 7/2010 | Acquaviva et al. | 318/721 |
| 2010/0295490 A1 | 11/2010 | Kuroshima et al. | 318/400.35 |

* cited by examiner

DETERMINING THE ZERO
CROSSING TIME OF BACK EMF

SAMPLE AND HOLD TIME STAMP FOR SENSING ZERO CROSSING OF BACK ELECTROMOTIVE FORCE IN 3-PHASE BRUSHLESS DC MOTORS

CROSS REFERENCE TO RELATED APPLICATION

This application is a continuation of, and claims priority under 35 U.S.C. §120 from, nonprovisional U.S. patent application Ser. No. 13/134,141, filed on May 31, 2011, now U.S. Pat. No. 8,358,093, which in turn is a continuation of, and claims priority under 35 U.S.C. §120 from, nonprovisional U.S. patent application Ser. No. 11/495,913, filed on Jul. 29, 2006, now U.S. Pat. No. 8,030,867. The entire subject matter of application Ser. Nos. 13/134,141 and 11/495,913 is incorporated herein by reference.

TECHNICAL FIELD

The present invention relates generally to controlling brushless, direct-current electric motors and, more specifically, to a method of determining the position of rotors of such motors.

BACKGROUND

An integrated circuit microcontroller can be used to generate the drive currents that power permanent-magnet, brushless DC motors. The drive currents are typically generated from a direct-current (DC) power supply that is switched and alternately inverted. One switching technique used to generate the drive currents uses pulse width modulation (PWM). For example, in an electric motor with three induction coils each separated by 120 degrees, PWM switching signals control the times and the durations at which six switches are opened and closed to produce the six pulsed signals that drive the motor. The process of turning the switches on and off to transfer drive current from one pair of induction coils to the next in a brushless DC motor is called electronic commutation. In a two-pole motor with three inductions coils, there are six commutation states for every revolution of the rotor. The PWM switching signals not only drive the motor, but also control the speed and torque of the motor. The speed and torque are controlled by varying the duty cycle of the PWM switching signals.

In order to determine how a permanent-magnet, brushless motor is operating, the position of the rotor relative to the stator is determined. The position of a pole of a rotor relative to the induction coils (also called phase windings) of the stator is typically determined in brushless motors by measuring the back electromotive force (back EMF) emanating from the phase winding through which drive current is not flowing. Back EMF is measured as a voltage. When the back EMF is equal to the motor neutral point voltage on the node between the three phase windings, the pole of the rotor is considered to have passed the zero crossing point associated with the phase winding from which the back EMF was measured. The time at which the back EMF equals the motor neutral point voltage is typically referred to as the time of zero crossing of the back EMF.

Various methods have been used to determine the zero crossing of the back EMF in brushless motors. One method uses a comparator to compare the back EMF to the motor neutral point voltage. One comparator for each of the three phase windings may be used, or one comparator and a multiplexer may also be used. When the back EMF of a phase winding passes the motor neutral point voltage and trips the comparator, the output of the comparator interrupts the processor. At that time, the processor determines whether the rotor has rotated too quickly or too slowly and adjusts the timing of the switching signals and the PWM duty cycle of the drive signals to compensate accordingly. At the time the comparator trips, the processor must stop the routine it was processing and service the interrupt. It is undesirable, however, for the processor to be interrupted during each commutation state while the motor is running.

Another method for determining the zero crossing point of the back EMF uses a digital signal processor (DSP) with an ultra-fast analog-to-digital converter (ADC) and an auto-sequencer. The back EMF is constantly subtracted from the neutral point voltage, and the DSP determines when the result is zero without interrupting the processor. Employing such a DSP, however, is expensive and uses considerable die area.

A method is sought for determining the zero crossing point of the back EMF in a brushless DC motor that requires neither interrupting the processor at the zero crossing point nor the use of an expensive DSP.

SUMMARY

A motor control system in a microcontroller determines the position of the rotor of a brushless, direct-current motor by determining the time of zero crossing of back electromotive force (EMF) emanating from each phase winding that is currently not being driven. The time of zero crossing is determined by interpolating voltage differentials that are time stamped. Each voltage differential is the difference between the phase voltage of the non-driven phase winding and the motor neutral point voltage. The time of zero crossing is determined without using a comparator and without interrupting the processor of the microcontroller each time the back EMF crosses the motor neutral point voltage. The processor interpolates the time of zero crossing independently of when the time zero of crossing actually occurs. Thus, the processor can calculate the time of zero crossing when the processor is not engaged in other tasks. The processor is not interrupted during each commutation state at the time of zero crossing.

In accordance with a method, a motor neutral point voltage is determined. In one embodiment, the motor neutral point voltage present on the node between the phase windings is calculated to be one half of the divided DC supply voltage ($V_{BUS}$) of the brushless DC motor.

A first sample of a phase voltage from the non-driven phase winding is sampled at a first time. This first phase voltage and an associated first time stamp are stored in registers. The first time stamp indicates the time at which the first phase voltage was sampled. A first voltage differential is calculated that is the difference between the first phase voltage and the motor neutral point voltage.

Then at a second time, a second sample of the phase voltage from the non-driven phase winding is sampled. This second phase voltage and an associated second time stamp are stored in registers. The second time stamp indicates the second time. A second voltage differential is calculated that is the difference between the second phase voltage and the motor neutral point voltage.

Finally, the time of zero crossing of the back EMF is determined using the first voltage differential, the first time stamp, the second voltage differential and the second time stamp. The time of zero crossing is determined by interpolating the time stamped voltage differentials.

An apparatus is disclosed that includes a sample and hold circuit, a timer, a time stamp register and a hold signal conductor. The timer count output by the timer is received onto the data input lead of the time stamp register. A phase voltage from a non-driven phase winding of a brushless, direct-current motor is received by the sample and hold circuit. The hold signal conductor is connected not only to the sample and hold circuit, but also to a load input lead of the time stamp register. Thus, when the hold signal is asserted on the hold signal conductor, the phase voltage is held by the sample and hold circuit, and the timer count is captured in the time stamp register.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
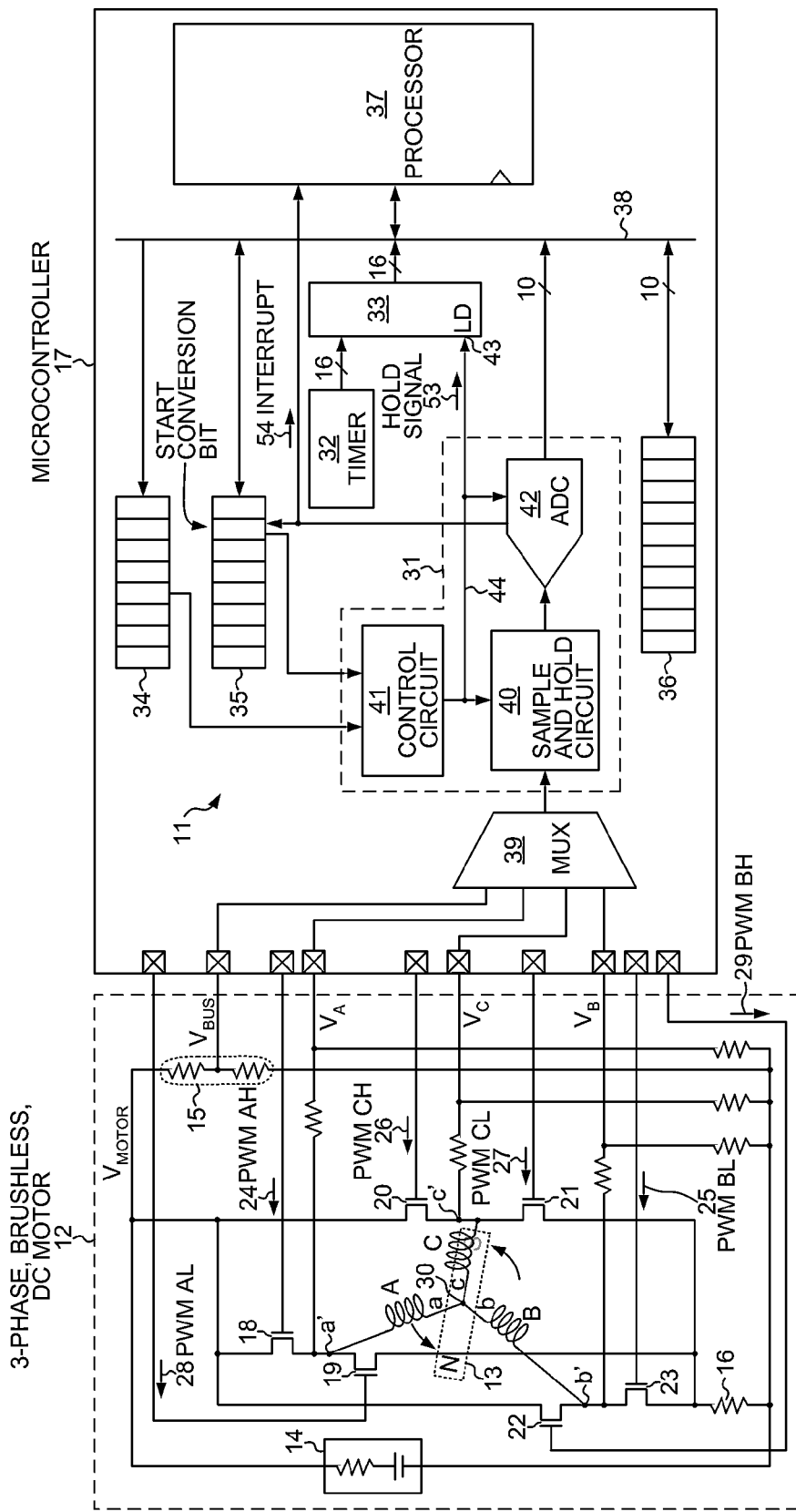
FIG. 1 is a simplified schematic block diagram of a system for determining a time of zero crossing of back electromotive force for a non-driven phase winding of a permanent-magnet, brushless DC motor.

FIG. 1 shows a motor control system 11 for determining the position of the rotor of a brushless DC motor relative to the stator of the motor. In one embodiment, the motor is a 3-phase, permanent-magnet brushless DC motor 12 that is powered by direct current. Motor 12 has a rotor 13 with two poles and a stator with three phase windings A, B and C. The phase windings are sometimes called induction coils. The three phase windings are separated from one another by 120 degrees. In this embodiment, motor 12 is powered by direct current from battery 14 that is supplied at a voltage $V_{MOTOR}$. A voltage divider 15 is used to provide a divided DC supply voltage ($V_{BUS}$) that approximates the voltage present on a node between the phase windings. A pull-down resistor 16 is used as a current sense resistor to determine the current flowing through three combinations of two of the three phase windings.

Figure 5:
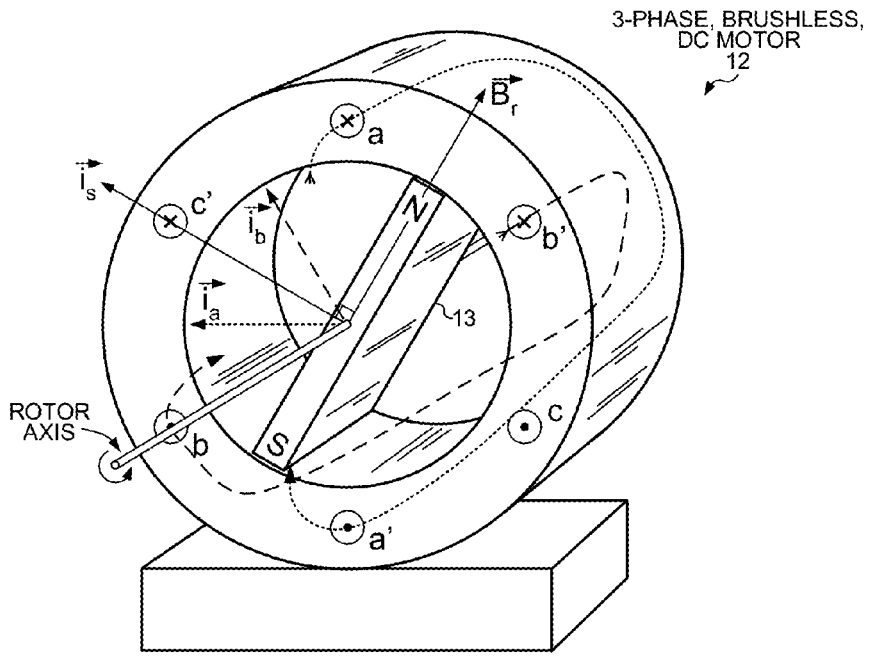
FIG. 5 illustrates the position of a 2-pole rotor in a 3-phase, brushless DC motor.

FIG. 1 provides a schematic representation of rotor 13 with its south pole crossing phase winding C of the stator. FIG. 5 below provides a physical representation of the north pole of rotor 13 passing the zero crossing point of phase winding C. System 11 is used to determine the precise time at which each of the poles of rotor 13 passes the zero crossing point of each of the three phase windings of the stator.

System 11 is incorporated into a microcontroller 17 that is specially adapted for motor control applications. For example, microcontroller 17 is a Z8 Encore! Flash Motor Control FMC microcontroller manufactured by ZiLOG, Inc. of San Jose, Calif. Microcontroller 17 generates the switching signals that control the switches that produce the drive currents that power electric motor 12. The switching signals open and close six field effect transistor switches 18-23 to produce the drive currents flowing through the phase windings. Each switching signal is generated using space-vector pulse width modulation (PWM) and defines the widths of the pulses during which each switch is conductive during an overall period when the switch is "open".

As two-pole rotor 13 rotates through one revolution within the 3-phase motor 12, the six switches 18-23 proceed through six combinations of open and closed states (six commutation states). Six switching signals 24-29 close both the "highside" and "lowside" switches of one phase winding, while a highside switching signal opens a highside switch to allow drive current to flow into a second phase winding, and while a lowside switching signal opens a lowside switch to allow the drive current to flow out of the third phase winding towards ground. The drive current flowing through the second and third phase windings creates maximum torque on the poles of the rotor when the rotor is perpendicular to the plane of the first phase winding through which no drive current is flowing.

For example, during one of the six commutation states, switches 20 and 21 associated with phase winding C are closed. Switches 19 and 22 are also closed. During this commutation state, switching signal 24 (PWM AH) opens switch 18, and switching signal 25 (PWM BL) opens switch 23. Drive current flows from node a' into phase winding A, through node a and node b, and then out through phase winding B to node b'. The current-carrying phase windings A and B that are subjected to the externally established magnetic field of rotor 13 create an electromagnetic torque on rotor 13 that is greatest when the poles of rotor 13 are aligned between the plane of phase winding A and the plane of phase winding B.

In order efficiently to control the operation of motor 12, the precise time at which rotor 13 passes a zero crossing point is determined. In this example, by determining the time at which rotor 13 passes the zero crossing point of phase winding C, switches 20 and 21 can be controlled to allow drive current to flow through phase winding C at the correct time. Ideally, no drive current flows through phase winding C from thirty rotational degrees before the zero crossing point until thirty rotational degrees after the zero crossing point. If drive current flows through phase winding C sooner than thirty degrees before the zero crossing point or after thirty degrees following the zero crossing point, an amount of torque from phase winding C will be exerted on rotor 13 in the opposite direction to the rotor rotation. Thus, if the commutation state is shifted too early or too late in time, motor 12 will not achieve its maximum torque.

System 11 uses the voltage on node c' to determine the position of rotor 13. Even when both switches 20 and 21 are closed and no drive current is flowing through phase winding C, the voltage on node c' nevertheless changes based on the movement of the magnetic field of a pole of rotor 13 within the induction coil of phase winding C. The voltage that builds up as the rotor moves within the phase windings is called the back electromotive force (back EMF). The south pole of rotor 13 passes the zero crossing point for phase winding C at the time when the back EMF on node c' equals the "motor neutral point voltage" on a node 30 between the three phase windings A, B and C. The time at which the back EMF associated with a non-driven phase winding crosses the motor neutral point voltage is referred to as the time of zero crossing of the back electromotive force. The time of zero crossing corresponds to the time when the rotor is perpendicular to the plane of the non-driven phase winding. System 11 determines the zero crossing of the back EMF without using an expensive digital signal processor and without interrupting the processor of microcontroller 17 at the time of zero crossing. Thus, system 11 does not compare the back EMF to the motor neutral point voltage using a comparator.

System 11 is part of microcontroller 17 and includes analog-to-digital conversion circuitry 31, a timer 32, a time stamp register 33, a sampling and settling time register 34, and ADC control register 35 and an ADC data register 36. In one embodiment, timer 32 is a 16-bit internal timer that operates in continuous mode by counting up and rolling over. Microcontroller 17 also includes a processor 37 that can write to and read from the registers via a data bus 38. ADC conversion circuitry 31 receives voltage signals from motor 12 that are selected by a multiplexer 39. ADC conversion circuitry 31 includes a sample and hold circuit 40, a control circuit 41 and an analog-to-digital converter 42. ADC conversion circuitry 31 is coupled to a load input lead 43 of time stamp register 33 by a hold signal conductor 44.

Figure 2:
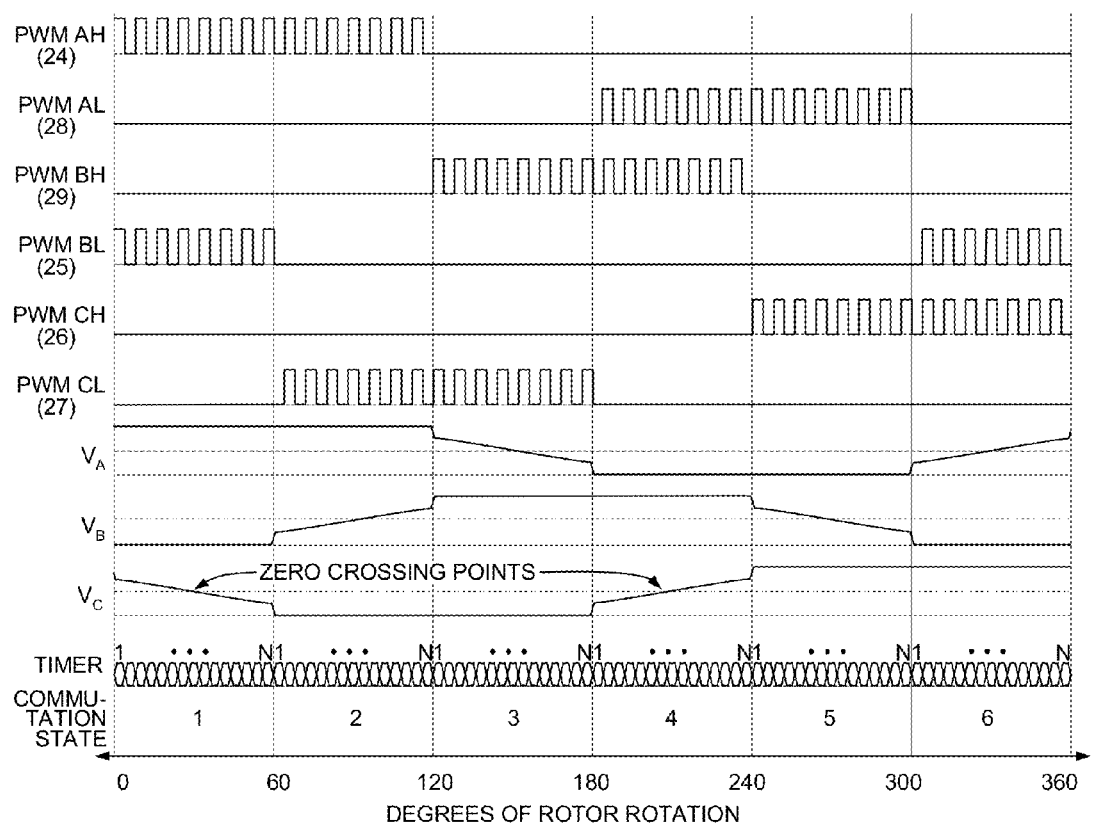
FIG. 2 is a waveform diagram of voltage waveforms on various nodes of the system and motor of FIG. 1.

FIG. 2 is a waveform diagram showing how the voltages of the switching signals 24-29 vary as rotor 13 rotates through 360 degrees. During each 120-degree period when a switch is "open", the switch is actually turned on only during the PWM pulses of switching signals 24-29 shown in FIG. 2. FIG. 2 also shows how the divided voltages $V_A$, $V_B$ and $V_C$ associated with the phase windings A, B and C vary as rotor 13 rotates through 360 degrees and six commutation states. When both switches associated with a phase winding are closed and the phase winding is not being driven, the divided voltage emanating from the phase winding displays a rising or falling back EMF. For example, during the first commutation state between zero and sixty degrees of rotation when both switches 20 and 21 coupled to node c' are closed, a falling back EMF is apparent in divided phase voltage $V_C$. System 11 determines when this falling back EMF crosses the motor neutral point voltage on node 30, as approximated by divided DC supply voltage ($V_{BUS}$). FIG. 2 also shows the timer count of timer 32 counting from 1 through N approximately every sixty degrees of rotation of rotor 13. In other embodiments, the timer count is independent of the rotation of rotor 13. For example, the timer count may count up and roll over in the middle of a commutation state.

Figure 3:
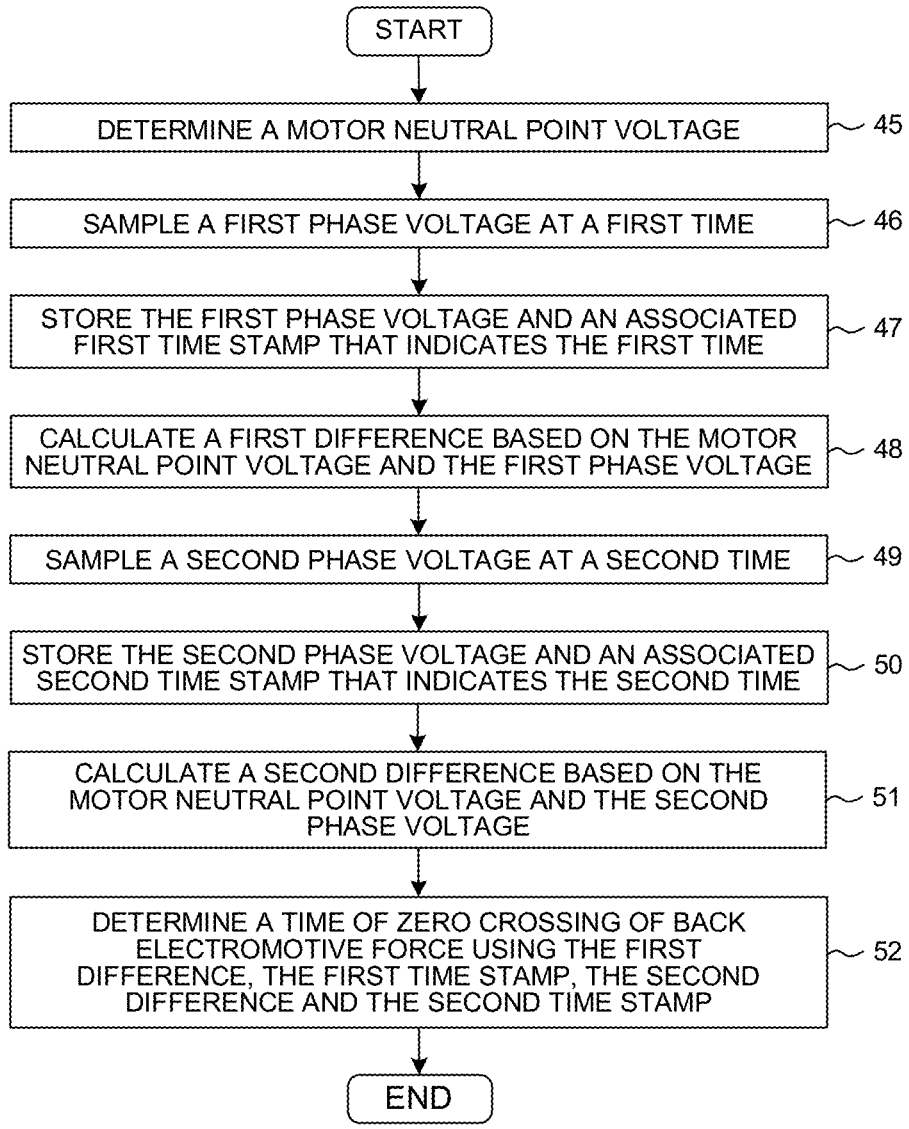
FIG. 3 is a flowchart of steps of a method by which the system of FIG. 1 determines the time of zero crossing of back electromotive force.

FIG. 3 is a flowchart illustrating steps 45-52 of a method by which system 11 determines the time of zero crossing of the back EMF for each commutation state. The steps of FIG. 3 will now be described in relation to the operation of system 11, as shown in FIG. 1.

In a step 45, system 11 determines the motor neutral point voltage of motor 12. The motor neutral point voltage present between phase windings A, B and C on node 30 is calculated to be one half of the divided DC supply voltage ($V_{BUS}$). At a point in time when processor 37 is free from performing other tasks, processor 37 writes a "start conversion bit" to a location in ADC control register 35. In this embodiment, the start conversion bit is written to bit seven of the 8-bit ADC control register 35. Processor 37 may write a start conversion bit to ADC control register 35 at a time that is independent of when a pole of rotor 13 passes a phase winding. Processor 37 also sets the bits in sampling and settling time register 34, which define how long sample and hold circuit 40 waits after a previous analog-to-digital conversion before sampling and holding a new voltage received from multiplexer 39. Writing a start conversion bit causes control circuit 41 to assert a hold signal 53 on hold signal conductor 44. Asserting hold signal 53 causes sample and hold circuit 40 to capture a sample from multiplexer 39 and to hold the voltage. Asserting hold signal 53 also causes ADC 42 to begin an analog-to-digital conversion on the held voltage.

When ADC 42 has completed its analog-to-digital conversion, ADC 42 clears the start conversion bit by writing a zero to bit seven of ADC control register 35. Thus, bit seven of ADC control register 35 acts as a dual purpose "start of conversion/end of conversion" bit. In one embodiment, processor 37 periodically polls the end of conversion bit. If the end of conversion bit is a zero, then processor 37 reads the digitized value output by ADC 42. Processor 37 writes the digitized value of the held voltage into 10-bit ADC data register 36. In another embodiment, ADC 42 sends an interrupt signal 54 to processor 37 when its analog-to-digital conversion is complete. The digitized motor neutral point voltage first stored in ADC data register 36 is subsequently stored in other memory within microcontroller 17.

In a step 46, system 11 samples a first phase voltage. In this example, the phase voltage being sampled is $V_C$ associated with the back EMF of phase winding C. Phase voltage $V_C$ is the voltage of node c' after being divided. In the embodiment of this example, motor 12 rotates at approximately 40,000 revolutions per minute. Therefore, 3-phase, 2-pole motor 12 has six 250-microsecond commutation states. Phase voltage $V_C$ is sampled multiple times during the first half of a commutation state. Within this 125-microsecond half commutation state, processor 37 initiates the sampling at a free moment when the processor is not performing other operations.

Processor 37 writes the start conversion bit into bit seven of ADC control register 35. Writing the start conversion bit causes control circuit 41 to assert hold signal 53 on hold signal conductor 44, which in turn causes sample and hold circuit 40 to capture and hold a first sample of phase voltage $V_C$ from multiplexer 39. Asserting hold signal 53 also causes ADC 42 to begin an analog-to-digital conversion on the held voltage. Besides being coupled to sample and hold circuit 40 and to ADC 42, hold signal conductor 44 is also coupled to load input lead 43 of time stamp register 33. Thus, asserting hold signal 53 also causes time stamp register 33 to capture the timer count output by timer 32 at the moment sample and hold circuit 40 is triggered and ADC 42 begins an analog-to-digital conversion.

When ADC 42 has completed its analog-to-digital conversion, ADC 42 clears the start conversion bit by writing a zero to bit seven of ADC control register 35. When processor 37 is free, it polls the "start of conversion/end of conversion" bit and determines that the analog-to-digital conversion is complete. Processor 37 then records the digitized value of the held voltage output by ADC 42 and stores the value in ADC data register 36. Finally, processor 37 reads the time stamp in time stamp register 33 and the digitized value in ADC data register 36. Although a time stamp is also captured in time stamp register 33 in step 45 when the motor neutral point voltage is sampled, the time stamp associated with the motor neutral point voltage is not used because the motor neutral point voltage varies with time at a much slower rate than does the phase voltage.

In a step 47, the digitized phase voltage $V_C$ together with the time stamp value are stored as a point in other memory within microcontroller 17. The time stamp value represents the time at which the first phase voltage $V_C$ was held and the digitization began.

Figure 4:
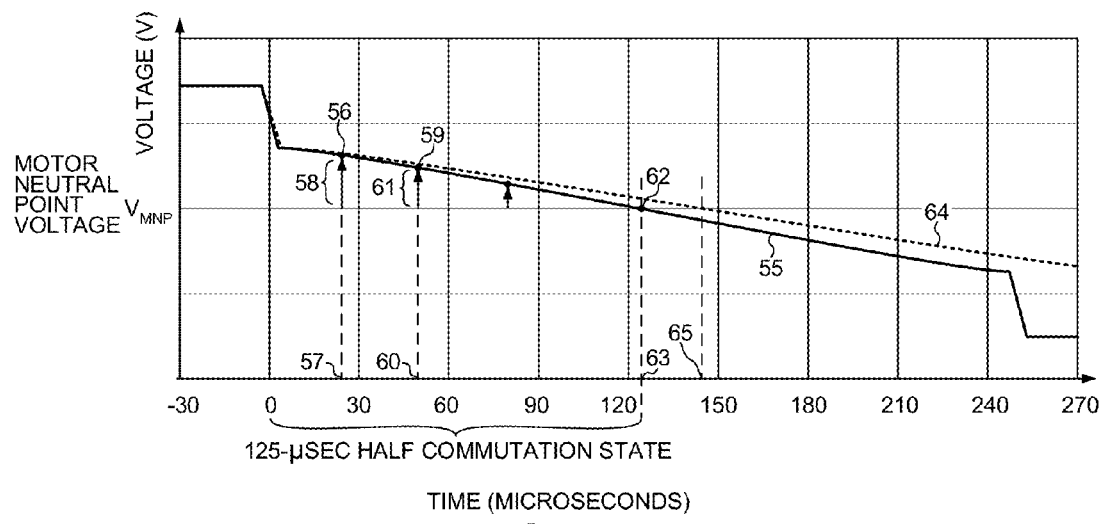
FIG. 4 is a waveform diagram of the phase voltage of a non-driven phase winding of the motor of FIG. 1 and illustrates the zero crossing interpolation performed by the system of FIG. 1.

FIG. 4 is a voltage waveform diagram of phase voltage $V_C$ varying over the 250-microsecond first commutation state of FIG. 2. Phase voltage $V_C$ is illustrated as a falling back EMF 55. At the beginning and end of the commutation state the phase voltage falls abruptly, whereas the phase voltage falls approximately linearly over the remainder of the commutation state. Phase voltage $V_C$ falls abruptly during the first commutation state as switch 19 is opened and switch 21 is closed, and then again as switch 20 is opened and switch 22 is closed. FIG. 4 shows a point 56 representing the digitized first phase voltage $V_C$ together with the time stamp value 57 stored in step 47.

In a step 48, processor 37 calculates the difference between the digitized motor neutral point voltage determined in step 45 and the digitized first phase voltage $V_C$ determined in step 46. A voltage differential 58 shown in FIG. 4 represents the difference calculated in step 48.

In a step 49, system 11 samples a second phase voltage associated with the back EMF of phase winding C. The second sample of phase voltage $V_C$ is sampled later during the first half of first commutation state. Processor 37 again writes the start conversion bit of ADC control register 35 causing (i) control circuit 41 to assert hold signal 53 on hold signal conductor 44, (ii) sample and hold circuit 40 to capture and hold a second sample of phase voltage $V_C$, (iii) ADC 42 to begin an analog-to-digital conversion on the held voltage, and (iv) time stamp register 33 to capture the timer count output by timer 32 at the moment sample and hold circuit 40 is triggered and ADC 42 begins the analog-to-digital conversion.

When processor 37 polls the "start of conversion/end of conversion" bit and determines that the analog-to-digital conversion is complete, processor 37 writes the digitized value of the second held voltage output by ADC 42 into ADC data register 36. Processor 37 then reads the second time stamp from time stamp register 33 and the second digitized value in ADC data register 36.

In a step 50, the second phase voltage $V_C$ together with the second time stamp value are stored as a point in other memory within microcontroller 17. Point 59 in FIG. 4 represents the second phase voltage $V_C$ together with a second time stamp value 60 stored in step 50.

In a step 51, processor 37 calculates the difference between the motor neutral point voltage and the second phase voltage $V_C$ determined in step 49. A voltage differential 61 shown in FIG. 4 represents the difference calculated in step 51.

In a step 52, processor 37 performs an interpolation operation on points 56 and 59 and determines a point 62 at which the back EMF 55 crosses the motor neutral point voltage. The motor neutral point voltage does not vary substantially over the approximately 125-microsecond period of the half commutation state. Therefore, only one sample of the motor neutral point voltage need be taken for each calculation of time of zero crossing of the back EMF. For example, in embodiments where motor 12 is powered by wall current alternating at sixty Hertz, the resulting rectified direct current ripples at a frequency of 120 Hz. Each ripple is longer than 8,000 microseconds. Thus, the time of zero crossing of back electromotive force is determined using the motor neutral point voltage, the first phase voltage, the first time stamp 57, the second phase voltage and the second time stamp 60. In FIG. 4, a time 63 is the time of zero crossing of the back EMF 55 for phase voltage $V_C$. Time 63 represents the time during the first commutation state at which the poles of rotor 13 are orthogonal to the plane of phase winding C.

By using system 11, processor 37 can perform the interpolation and determine the time of zero crossing at a time other than the time of zero crossing. Where a comparator is used to compare the motor neutral point voltage to the back EMF, the processor is typically interrupted at the time of zero crossing during each commutation state. The time of the interrupt indicates to the processor the time of zero crossing. Interrupting the processor at each time of zero crossing is an inefficient use of computing resources because the task being performed by the processor at the time of zero crossing must be halted. System 11 allows processor 37 to determine the time of zero crossing when the processor is not in the middle of performing other tasks. For example, processor 37 can even use interpolation to determine when the time of zero crossing will occur before that time has arrived. In this embodiment, processor 37 performs the interpolation at a free moment during the second 125-microsecond half of the commutation state. By determining the time of zero crossing during the second half of the commutation state, the beginning of the very next commutation state can be adjusted using switching signal 27 (PWM CL) to correct for a rotor that is rotating too slowly or too fast. In other embodiments, processor 37 does not determine the time of zero crossing for each commutation state, but rather performs an interpolation during a free moment several commutation states later. In some applications, motor 12 can still be adequately controlled when the time of zero crossing is not determined for each commutation state because a rotor whose zero crossing point occurs too early or too late in one commutation state is likely to behave similarly in the immediately following commutation states.

Processor 37 uses the time of zero crossing to adjust the switching signals 24-27 so that the drive current through a phase winding begins to flow immediately following thirty degrees after the zero crossing point. This provides the maximum torque on the poles of the rotor. For example, processor 37 corrects for a slower rotation of rotor 13 by delaying the time at which the phase windings are commutated in the next commutation state. In addition, processor 37 corrects for a slower rotation of rotor 13 by increasing the duty cycle of the PWM switching signals.

FIG. 4 also shows a back EMF 64 that falls slower than back EMF 55. The time 65 of zero crossing of back EMF 64 is consequently later than time 63. A delay in the time of zero crossing would occur, for example, if motor 12 powers a vacuum cleaner and the vacuum intake becomes plugged with an object. The added load on the vacuum motor would slow the rotation of the rotor. To correct for the slower rotation in this example, processor 37 would delay the opening of switch 20 and the closing of switch 22 in order to postpone the beginning of the second commutation state. Processor 37 would also increase the duty cycle of the PWM switching signals.

FIG. 5 illustrates the physical position of a 2-pole rotor at the time of zero crossing of back EMF for one commutation state in a 3-phase, brushless DC motor. The representation of the zero crossing point in FIG. 1 is schematic. In a physical 3-phase electric motor, however, the zero crossing point does not occur when a pole of the rotor passes over one of three phase windings that are separated from each other by 120 degrees. Instead, the coils of the three phase windings are physically oriented in planes that intersect at the axis of rotation of the rotor. FIG. 5 shows rotor 13 rotating within the phase windings A, B and C at the time of zero crossing of back EMF for phase winding C.

The position of rotor 13 in FIG. 5 corresponds to the zero crossing point in commutation state 4 in FIG. 2. During commutation state 4, switches 20 and 21 associated with phase winding C are closed. Switches 18 and 23 are also closed. During this commutation state, switching signal 28

(PWM AL) opens switch 19, and switching signal 29 (PWM BH) has already opened switch 22. Drive current flows from node b' into phase winding B, through node b and node a, and then out through phase winding A to node a'. The time of zero crossing occurs when the poles of rotor 13 are aligned between the planes of phase windings A and B. When the poles of rotor 13 are aligned between the planes of phase windings A and B, the magnetic field of the rotor ($B_r$) is perpendicular to the sum of the current components ($i_s$) of the phase windings A and B. Thus, FIG. 5 shows the space-vector representation of the combined phase currents ($i_s$) at a 90-degree angle from the rotor's magnetic field ($B_r$). The current-carrying phase windings B and A that are subjected to the externally established magnetic field of rotor 13 together create an electromagnetic torque on rotor 13 that is greatest at the time of zero crossing. System 11 determines precisely when the time of zero crossing occurs and when the north pole of rotor 13 is in the position shown in FIG. 5 or when one of the other five zero crossing points for 2-pole, 3-phase motor 12 occurs.

Figure 6:
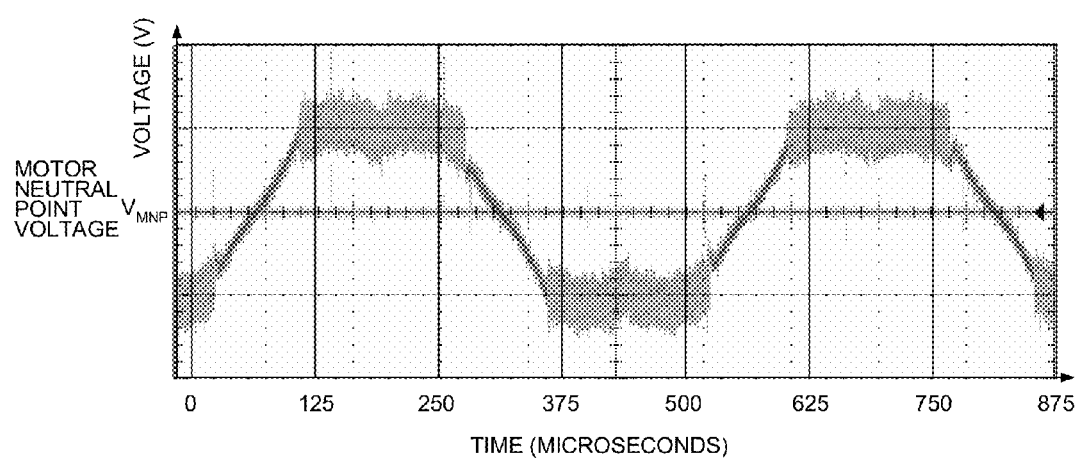
FIG. 6 is a waveform diagram of the phase voltage of a phase winding of the motor of FIG. 1.

FIG. 6 shows the voltage waveform of the phase voltage emanating from one phase winding of motor 12. In this embodiment of FIG. 6, motor 12 is a 4-pole, 3-phase motor that rotates at 40,000 rpm. Thus, each commutation state has a period of 125 microseconds. FIG. 6 shows a rising back EMF from a phase winding that is not driven during the commutation state from zero to 125 microseconds. The rising back EMF crosses the motor neutral point voltage approximately in the middle of the commutation state.

Although the present invention has been described in connection with certain specific embodiments for instructional purposes, the present invention is not limited thereto. Although motor control system 11 has been described in relation to a 3-phase motor, system 11 can also determine the time of zero crossing for motors with more than three phase windings, for example six phases. System 11 can also determine the time of zero crossing for motors with various numbers of poles, for example two, four, six or eight poles. Determining the zero crossing point by interpolating time stamped voltage samples can also be used to determine how battery 14 is charging and discharging. The rate at which the charge voltage on battery 14 passes various thresholds indicates that the battery is approaching a fully charged or fully discharged condition. Accordingly, various modifications, adaptations, and combinations of various features of the described embodiments can be practiced without departing from the scope of the invention as set forth in the claims.

What is claimed is:

1. A device comprising:
   (a) a processor; and
   (b) means for interpolating a plurality of sampled phase voltages associated with one phase winding to determine a time of zero crossing of back electromotive force for the phase winding.

2. The device of claim 1, wherein the device uses the time of zero crossing to determine a position of a rotor of a three-phase, brushless, direct-current motor.

3. The device of claim 2, wherein the three-phase, brushless, direct-current motor has a rotor with two poles and a stator with three phase windings.

4. The device of claim 1, wherein the device is part of a battery-powered hand tool.

5. The device of claim 1, wherein the processor determines the time of zero crossing after the time of zero crossing has already occurred.

6. The device of claim 1, wherein the processor does not receive an interrupt at the time of zero crossing.

7. The device of claim 1, wherein the means employs a time stamp for each of the plurality of sampled phase voltages to determine the time of zero crossing.

8. The device of claim 1, wherein the means comprises a sample and hold circuit.

9. The device of claim 1, wherein the means does not include a comparator.

10. The device of claim 1, wherein the means determines the time of zero crossing using a voltage differential based on a motor neutral point and a phase voltage of the phase winding.

11. The device of claim 1, wherein the means determines a motor neutral point voltage using a voltage divider.

12. The device of claim 1, wherein the processor is not a digital signal processor, and wherein the time of zero crossing of back electromotive force is determined without using a digital signal processor.

13. The device of claim 1, wherein the phase winding is a non-driven phase winding of a direct-current motor.

14. The device of claim 1, wherein the processor determines the time of zero crossing before the time of zero crossing has arrived.

15. The device of claim 1, further comprising:
   a time stamp register, wherein the means stores a time stamp associated with one of the plurality of sampled phase voltages in the time stamp register.

* * * * *